US00RE50369E

(19) United States
(12) Reissued Patent
Warren et al.

(10) Patent Number: US RE50,369 E
(45) Date of Reissued Patent: Apr. 8, 2025

(54) DETECTION OF DISCHARGE OF PROJECTILE FROM FIREARM

(71) Applicant: HDWB, LLC, El Paso, TX (US)

(72) Inventors: John Myrl Warren, El Paso, TX (US); Eric William Hoffmann, Saint Francis, WI (US)

(73) Assignee: HDWB, LLC, El Paso, TX (US)

(21) Appl. No.: 18/113,550

(22) Filed: Feb. 23, 2023

Related U.S. Patent Documents

Reissue of:
(64) Patent No.: 10,928,244
Issued: Feb. 23, 2021
Appl. No.: 16/243,468
Filed: Jan. 9, 2019

U.S. Applications:
(60) Provisional application No. 62/615,572, filed on Jan. 10, 2018.

(51) Int. Cl.

| | |
|---|---|
| ***G01H 3/08*** | (2006.01) |
| ***F41H 11/00*** | (2006.01) |
| ***G01H 3/04*** | (2006.01) |
| ***G01H 3/12*** | (2006.01) |
| ***G10L 25/18*** | (2013.01) |
| ***G10L 25/51*** | (2013.01) |
| ***G10L 25/72*** | (2013.01) |
| ***H04R 29/00*** | (2006.01) |

(52) U.S. Cl.
CPC ..... *G01H 3/08* (2013.01); *G01H 3/04* (2013.01); *G01H 3/12* (2013.01); *G10L 25/51* (2013.01); *H04R 29/00* (2013.01); *F41H 11/00* (2013.01); *G10L 25/18* (2013.01); *G10L 25/72* (2013.01)

(58) Field of Classification Search
CPC ... G01H 3/08; G01H 3/04; G01H 3/12; G01L 25/51; G01L 25/18; G01L 25/72; H04R 29/00; F41H 11/00; G10S 2205/07; G10S 5/18
See application file for complete search history.

(56) References Cited

U.S. PATENT DOCUMENTS 5,973,998 A * 10/1999 Showen ..... G01S 5/0036 367/129
8,995,227 B1 * 3/2015 Johnson ..... G01S 5/06 367/906
10,810,854 B1 * 10/2020 Correnti ..... G08B 1/08
10,887,698 B2 * 1/2021 Bereketli ..... H04R 3/005
(Continued)

*Primary Examiner* — Ovidio Escalante
(74) *Attorney, Agent, or Firm* — Georgiy L. Khayet

(57) ABSTRACT

Disclosed are methods and systems for detection of a discharge of a projectile from a firearm. An example method for detection of a discharge of a projectile from a firearm may commence with recording environmental audio by at least one microphone associated with at least one electronic device. The method may continue with triggering, by a processing unit associated with the at least one electronic device, based on predetermined triggering criteria, a frequency analysis of the environmental audio. The analysis may be performed to determine a likelihood of the projectile being discharged from the firearm. The method may further include transferring, by a data transfer unit associated with the at least one electronic device, results of the frequency analysis from the at least one electronic device to a data storage unit for post-processing.

22 Claims, 10 Drawing Sheets

(56) References Cited

U.S. PATENT DOCUMENTS

| | | | | |
|---|---|---|---|---|
| 2006/0256660 | A1* | 11/2006 | Berger | G01S 7/52001 367/124 |
| 2009/0122650 | A1* | 5/2009 | Calhoun | G01S 5/18 367/129 |
| 2010/0226210 | A1* | 9/2010 | Kordis | G01S 5/0027 367/127 |
| 2013/0163776 | A1* | 6/2013 | Yamkovoy | G10K 11/17885 381/72 |
| 2013/0202120 | A1* | 8/2013 | Bickel | G08B 13/1672 381/56 |
| 2014/0269199 | A1* | 9/2014 | Weldon | G01S 5/18 367/124 |
| 2014/0361886 | A1* | 12/2014 | Cowdry | G08B 13/1672 340/522 |
| 2017/0328983 | A1* | 11/2017 | Volgyesi | G01S 5/28 |

* cited by examiner

DETECTION OF DISCHARGE OF PROJECTILE FROM FIREARM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

The present utility patent application *is a reissue application of U.S. Pat. No. 10,928,244 and claims benefit under 35 U.S.C. 120 as an application for reissue of U.S. Pat. No. 10,928,244, originally issued on Feb. 23, 2021, which* claims the priority benefit under 35 U.S.C. 119(e) of U.S. provisional application No. 62/615,572, filed on Jan. 10, 2018, and titled "METHOD AND SYSTEM OF DETECTION FOR DETERMINING THE PRESENCE OF LETHAL PROJECTILE WITH ELECTRONIC AUDIO PROCESSING DEVICE." The disclosure of this provisional application is incorporated herein by reference for all purposes to the extent that such subject matter is not inconsistent herewith or limiting hereof.

TECHNICAL FIELD

This disclosure generally relates to electronic audio signal processing devices for determination of audible presence of a projectile. More particularly, this disclosure relates to methods and systems for determining the audio presence of a gunshot in a proximity of one or more electronic processing devices having microphones.

BACKGROUND

Conventional gunshot detection may be accomplished by recording and post-processing of audio signal at an offsite location. A typical gunshot detection procedure may include positioning an outdoor microphone array on roofs of several buildings around a metropolitan area. The audio from the microphone array can be sent to a central processing location to be post-processed in order to determine whether a gunshot has been detected. Other existing methods for gunshot detection may rely on the sound pressure level generated by the gunshot. The sound pressure level is compared to an ambient condition to determine the likelihood of a gunshot event.

A conventional gunshot detection device may listen to environmental sounds to detect a loud noise. When a noise exceeding a predetermined level is detected, the gunshot detection device can relay the detected sound to a central office where an operator listens to the detected sound to determine whether the sound is similar to a sound of gunshot. In case of a positive determination, the operator can send a report to an appropriate agency.

Conventional indoor systems for gunshot detection can include multiple sound sensors and infrared sensors installed in different rooms of a building. The sound sensors can detect a sound and the infrared sensors can detect a muzzle flash. When both a sound that exceeds the predetermined loudness and the muzzle flash are detected by the sensors, the system can send a report to an appropriate agency.

Additionally, conventional gunshot detection devices are usually fixed indoor or outdoor, such as light poles, towers, roofs of buildings, but are inapplicable for portable use. Furthermore, conventional gunshot detection devices are typically special-purpose devices that cannot be integrated into existing devices for installation of the system inside or outside of a building.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

This disclosure is directed to methods and systems for detection of a discharge of a projectile from a firearm. An example method for detection of a discharge of a projectile from a firearm may commence with recording environmental audio by at least one microphone associated with at least one electronic device. The method may continue with triggering, by a processing unit, based on predetermined triggering criteria, frequency analysis of the environmental audio. The analysis may be performed to determine a likelihood of the projectile being discharged from the firearm. The method may further include transferring, by a data transfer unit, results of the frequency analysis from the at least one electronic device to a data storage unit for a post-processing.

An example system for detection of a discharge of a projectile from a firearm may include a microphone, a processing unit, a data transfer unit, and a data storage unit associated with at least one electronic device. The microphone may be configured to record environmental audio. The processing unit may be configured to trigger, based on predetermined triggering criteria, frequency analysis of the environmental audio to determine a likelihood of the projectile being discharged from the firearm. The data transfer unit may be configured to transfer results of the frequency analysis from the at least one electronic device to a data storage unit for post-processing. The data storage unit may be configured to store at least the results of the frequency analysis.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
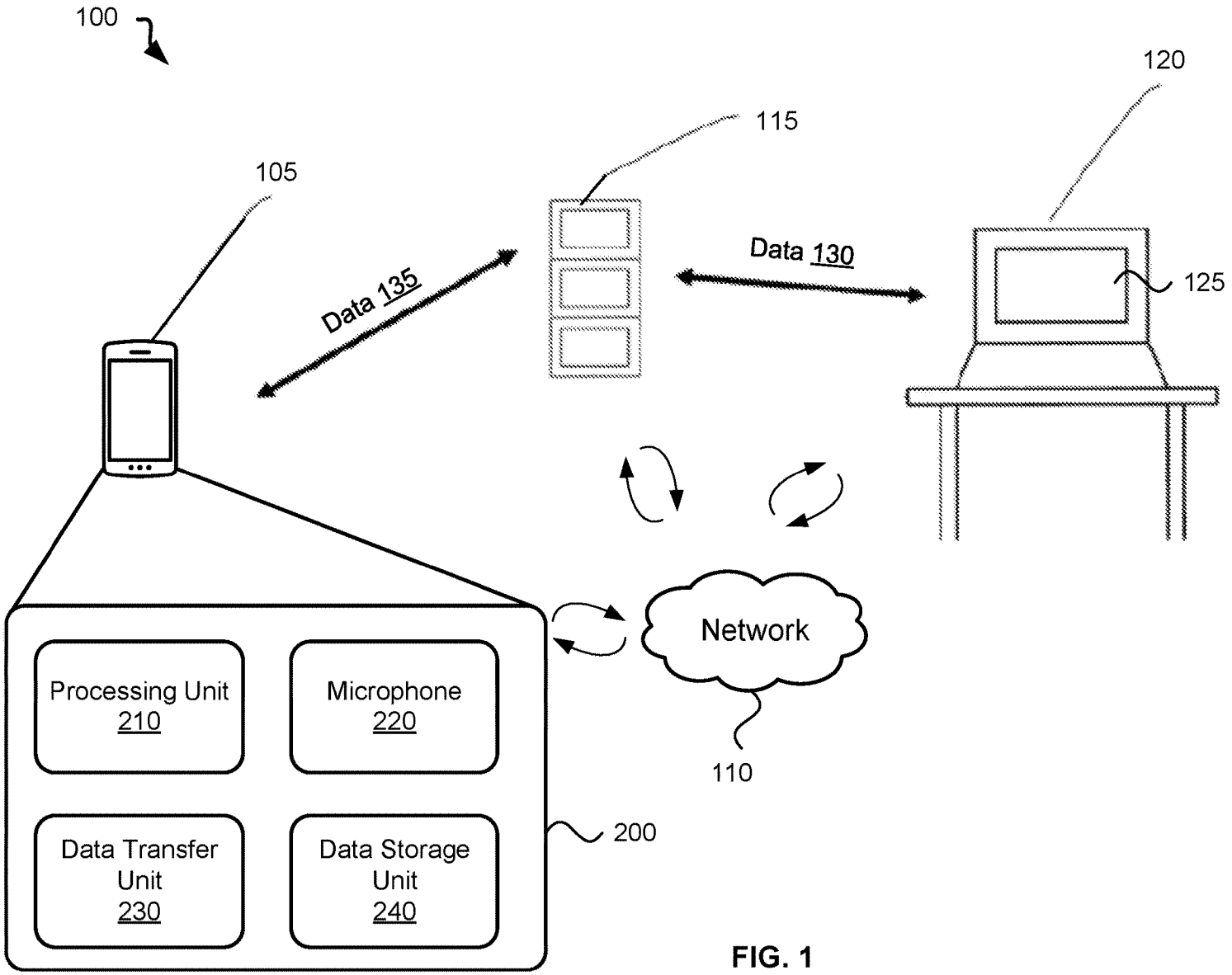
FIG. 1 illustrates an example environment within which methods and systems for detection of a discharge of a projectile from a firearm can be implemented, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Embodiments of the present disclosure generally relate to methods and systems for detection of a discharge of a projectile from a firearm. In an example embodiment, a system of the present disclosure may be implemented using an electronic device, such as a mobile cell phone, to detect a gunshot, i.e., a discharge of a projectile from a firearm, in proximity to the electronic device. The detection of the discharge of the projectile may be performed using a microphone, a processing unit, a data transfer unit, and a data storage unit of the electronic device. The microphone may continuously collect audio signals from an environment surrounding the electronic device. The audio signals may be processed locally by the processing unit of the electronic device with a real-time correlation of the recorded audio signals with a predetermined calibration signal. The predetermined calibration signal may be a signal that characterizes a projectile discharge. Specifically, the processing unit can be configured in the form of a spectral frequency analyzer and may use a correlation method to compare frequency and amplitude of the incoming audio signal to frequency and amplitude of a known calibration signal in real-time. In particular, the unique audio signal generated by a supersonic projectile along with the sound created by the explosion expelling the projectile may be considered in the correlation method.

The processing unit may analyze the recorded environmental audio and detect a first peak in the amplitude of a sound wave and a second peak in the amplitude of the sound wave generated by the environmental audio. The first peak may be indicative of the projectile breaking a sound barrier or an explosion expelling the projectile from the firearm. The second peak may be indicative of the explosion expelling the projectile from the firearm or the projectile breaking the sound barrier. The two peaks are separated by a lull. It should be understood that while, in some embodiments, the first peak is associated with the supersonic projectile and the second peak is associated with the explosion, in some other embodiments, the reverse is true and the first peak is associated with the explosion and the second peak is associated with the supersonic projectile.

The processing unit may correlate the first peak and the second peak using a predetermined correlation to determine a likelihood of the projectile being discharged from a firearm, i.e., the likelihood of a gunshot. The processing unit may further perform averaging of an ambient sound level to further define settings of the correlation method and to set a base level of incoming sound signal. The output data of the correlation method may include the likelihood of the projectile being discharged from the firearm in a vicinity of the electronic device.

Additionally, the system for detection of a discharge of a projectile from a firearm may be implemented in a form of a plurality of portable electronic devices worn by users, stationary electronic devices for indoor and outdoor use, mobile electronic devices for use in vehicles, and so forth. The origin of discharging of the projectile can be determined using the plurality of electronic devices with global positioning system (GPS) units or other positioning systems. Both stationary and moving electronic devices can be used in a triangulation algorithm for determination of the likelihood of the projectile being discharged from the firearm.

The output data concerning the likelihood of the projectile being discharged from the firearm may then be sent by the electronic device to a remote data processing and storage server via a wired or wireless data transmission. The stored output data can then be recalled by a user using a local or remote data viewing portal. The data viewing portal may include a website for providing access to all data concerning the processing of the incoming audio signal.

Thus, the methods and systems of the present disclosure can include projectile detection by enabling a plurality of electronic devices to process local environment audio signals to provide a high-fidelity probability as to whether an event, i.e., the discharge of a projectile, has occurred. In contrast to conventional gunshot detection systems that are decibel-based and detect only presence of a sound of which the loudness is higher that a predetermined loudness, the methods and systems of the present disclosure perform frequency and amplitude analysis of a sound wave to determine whether the sound wave has a peak showing that the sound is caused by a projectile traveling with a supersonic speed or a peak showing that the sound is generated by the projectile when expelled from a confined chamber of a firearm, and calculate a detection time of each of the peaks to determine a time difference between two peaks.

Furthermore, the methods and systems of the present disclosure allow determining an origin of the discharge of the projectile using a plurality of moving electronic devices. Thus, a location of an active shooter can be determined.

Additionally, in the methods and systems of the present disclosure, all processing related to determination as to whether the projectile has been discharged can be performed on electronic devices in a proximity of a location where a gunshot event occurred. In some example embodiments, the electronic devices do not need to transmit recorded audio files to remote data processing and storage servers for further post-processing, but send only a report showing whether the projectile discharge is detected and additional data, such as a location of the electronic device, time when the shot event was detected, and so forth. In other words, the electronic devices may not need to transfer the audio files that contain sensitive personal data related to users in the proximity of the electronic devices to the remote data processing and storage servers.

The additional data may be post-processed by the remote data processing and storage servers in combination with data received from other electronic devices to determine additional information related to the projectile discharge, such as a speed of movement of the electronic device, acceleration of the electronic device, location of the gunshot event, and so forth.

The term "electronic device" can include any device, system, or apparatus with audio signal collecting and processing capabilities. Some examples of the electronic device include, without limitation, a cellular phone, a mobile phone, a smart phone, a tablet computer, a laptop computer, a personal digital assistant, a portable computing device, a desktop computer, a workstation, a netbook, a server, a smart television system, and so forth. The methods and systems can be used across multiple hardware platforms and may apply multiple data transfer protocols.

Referring now to the drawings, FIG. 1 illustrates an environment 100 within which systems and methods for detection of a discharge of a projectile from a firearm can be implemented, in accordance with some embodiments. The environment 100 may include an electronic device 105, a system 200 for detection of a discharge of a projectile from a firearm (also referred herein to as a system 200), a data processing and storage server 115, a data viewing portal 120, a web-accessed application 125 accessible via the data viewing portal 120, and a data network 110 (e.g., the Internet or a computing cloud).

The electronic device 105, the system 200, the data processing and storage unit 115, and the data viewing portal 120 may be connected via the data network 110. The electronic device 105 may be a projectile discharge detection hardware device and may include a personal computer (PC), a laptop, a smartphone, a tablet PC, a television set, a smartphone, an Internet phone, a netbook, a network appliance, and so forth. The system 200 may be implemented on the electronic device 105 to detect the presence of a projectile discharge, provide subsequent alerts, and initiate actions based on the detection of the projectile discharge from the firearm. The elements of the system 200 are described in detail with reference to FIG. 2.

The data network 110 may include a computing cloud, the Internet, or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

The electronic device 105 may record environmental audio, analyze the recorded environmental audio, and determine whether the projectile was discharged from the firearm. The electronic device 105 may send data 135 relating to the results of the frequency analysis to the data processing and storage server 115. The data processing and storage server 115 may perform post-processing of data 135 received from the data processing and storage server 115. Upon on the post processing, the data processing and storage server 115 may send the post-processed data 130 to the data viewing portal 120. In some embodiments, the post-processed data 130 provided by the data processing and storage server 115 to the data viewing portal 120 may also include data 135 relating to the results of the frequency analysis. The data viewing portal 120 may be accessible by a plurality of users. The users may be associated with public and private authorities, such as police, security services, governmental agencies, and other relevant authorities. The data viewing portal 120 may show an alert that the gunshot was detected and a location of the detected gunshot.

Figure 2:
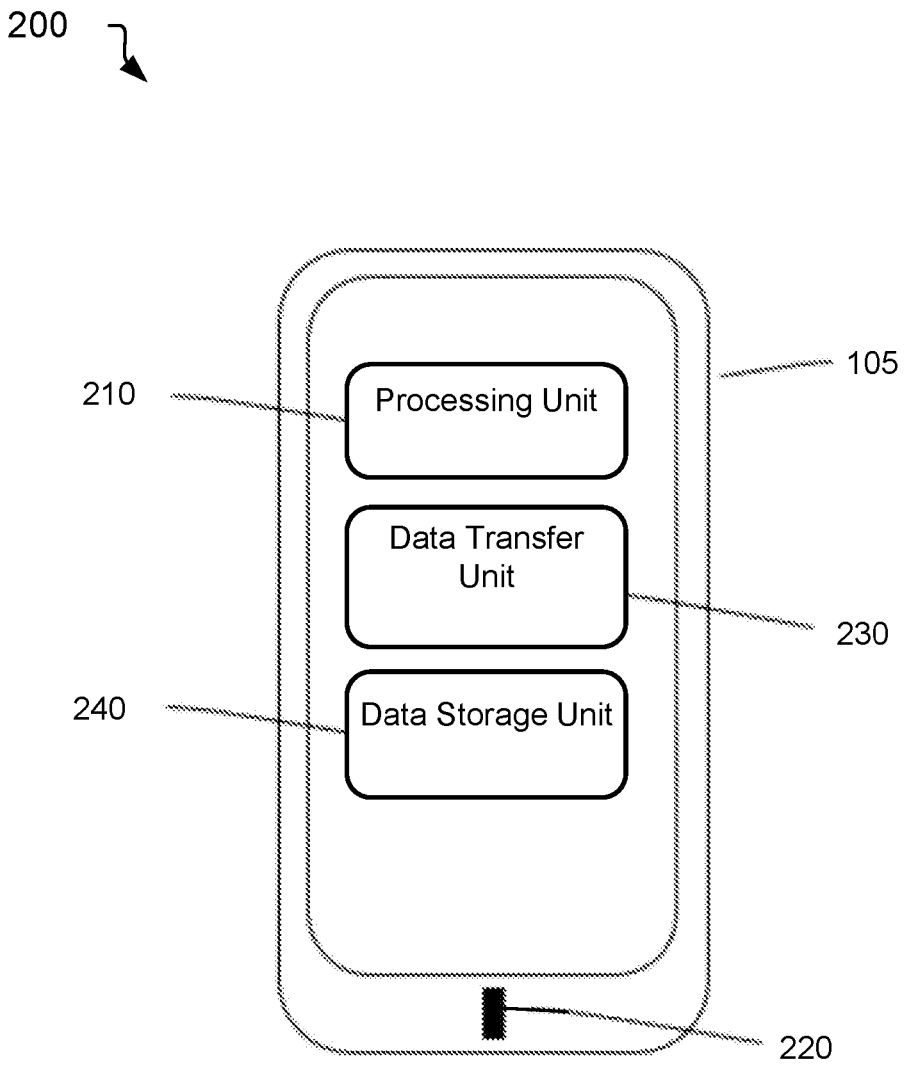
FIG. 2 is a block diagram showing various modules of a system for detection of a discharge of a projectile from a firearm, in accordance with certain embodiments.

FIG. 2 is a block diagram showing various modules of a system 200 for detection of a discharge of a projectile from a firearm. The system 200 may be running on an electronic device 105. The electronic device 105 may be selected from a smart phone, a stationary device, a device installed on a vehicle, and so forth. The projectile may be a bullet discharged from the firearm.

The system 200 may include a processing unit 210, a microphone 220, a data transfer unit 230, and a data storage unit 240. In an example embodiment, a software application associated with the system 200 may be running on the electronic device 105.

The microphone 220 may be configured to record environmental audio and provide the recorded environmental audio as an input data to the processing unit 210. The processing unit 210 may operate as a gunshot detection hardware unit. The processing unit 210 may be selected from a group comprising: a single board computer, a microprocessor board, a microcontroller board, a vehicle control box, a personnel tracker, a mobile radio, a handheld radio, and so forth. The processing unit 210 may receive environmental audio from the microphone 220. The processing unit 210 may be configured to trigger, based on predetermined triggering criteria, a frequency analysis of the environmental audio. The predetermined triggering criteria may include the environmental audio exceeding a predetermined decibel level. In an example embodiment, the processing unit 210 may be configured in a form of a spectral frequency analyzer. When the environmental audio exceeds the predetermined decibel level, the spectral frequency analyzer may be triggered to perform the frequency analysis of the environmental audio.

In a further example embodiment, the frequency analysis may include passing the environmental audio through a Fast Fourier Transform (FFT) algorithm. The frequency analysis may continue with receiving, from the FFT, a full spectrum of a frequency and an amplitude of an audio wave of the environmental audio over time.

The frequency analysis may be performed as follows. Firstly, the processing unit 210 may detect a first peak in an amplitude of a sound wave generated by the environmental audio. The first peak may be indicative of a projectile breaking a sound barrier. Secondly, processing unit 210 may detect a second peak in the amplitude of the sound wave. The second peak may be indicative of an explosion expelling the projectile from the firearm. The processing unit 210 may further correlate the first peak and the second peak based on a predetermined correlation to determine a likelihood of the projectile being discharged from the firearm. The processing unit 210 may further determine a time difference between the first peak and the second peak. The correlation may be based on a proximity, i.e., a time difference, between the first peak and the second peak, as well as a relationship between frequencies of the first peak and the second peak. Specifically, the time difference between the first peak and the second peak may be correlated to a predetermined time interval to determine whether two peaks show that the projectile was discharged. The predetermined time interval may be a time interval of passing between breaking a sound barrier by the projectile and an explosion expelling the projectile from the firearm. Furthermore, the processing unit 210 may match the frequency of the first peak and a predetermined frequency of a sound generated by a projectile breaking a sound barrier. The processing unit 210 may further match the frequency of the second peak and a predetermined frequency of a sound generated by an explosion expelling the projectile from the firearm. In other words, frequencies of the first peak and the second peak can be correlated to a predetermined frequency of a sound wave exceeding the sound barrier and a predetermined frequency of a sound wave generated by an explosion expelling the projectile from the firearm, respectively. The predetermined time interval and predetermined frequencies for the first peak and the second peak may be preliminarily set based on historic data determined by analyzing sound waves generated by the discharge of a projectile from a firearm. Therefore, based on the frequency analysis, the processing unit 210 may determine the likelihood of the projectile being discharged from the firearm.

Additionally, the processing unit 210 may record detection times of the first peak and the second peak. Upon recording of the detection times, as clocks on the electronic device may be not synchronized, the processing unit 210 may synchronize the detection times using a geosynchronous satellite source. As the electronic devices are portable and may move at the time of the projectile discharge, the processing unit 210 may further record locations of the electronic device at a time of detection of the first peak and at a time of detection of the second peak using location services associated with the electronic device. The locations of the electronic device may be determined using one or more of the following: GPS units of the electronic device, Global System for Mobile Communications (GSM) locators of the electronic device by triangulation from the known antenna positions of a GSM cell network, routers of Wi-Fi networks to which the electronic device are connected, and so forth. Thus, the processing unit 210 may request a timestamp of detection of peaks by the electronic device and a location stamp of the electronic device from the geosynchronous satellite source. Upon receiving the peak timestamps and the location stamps of each of the portable electronic devices, the processing unit 210 may determine an origin location and time of the projectile discharge based on triangulation of the locations of the electronic device for corresponding detection times.

The data related to the determination of the likelihood of the projectile being discharged performed by the processing unit 210 may be provided as output data to other units or devices and may trigger one or more actions to be performed by the processing unit 210 or physical actuation of one or more further units or devices. In particular, the data transfer unit 230 may be configured to transfer results of the frequency analysis from the electronic device 105 to a remote data storage unit for a post-processing. The results of the frequency analysis may be transferred from the electronic device to the data storage unit for post-processing using one or more of the following protocols: Ethernet, Fiber optics, a mobile data protocol, cellular network, Wi-Fi, Bluetooth, Bluetooth low energy (BLE), ultra-high frequency (UHF) 2-way radio, very high frequency (VHF) 2-way radio, Near Field Communication, Satellite, ZigBee, Microwave, an Infrared radiation protocol, and so forth. In an example embodiment, the post-processing may include one or more of the following: formatting data for visualization on a user interface, a triangulation of an origin of the projectile, an improvement of the correlation, and the like. In an example embodiment, the remote data storage unit may include a data processing and storage server 115 as shown on FIG. 1.

The data storage unit 240, such as a Random Access Memory (RAM), of the system 200 may be configured to store at least the collected audio data and the results of the frequency analysis.

In some example embodiments, the data transferred to the processing unit 210 or the remote data storage unit may be accessed by a user via a data viewing portal. The data viewing portal can be accessed by the user on a local computer, such as the electronic device 105, for example, via a web-accessed application.

Figure 3:
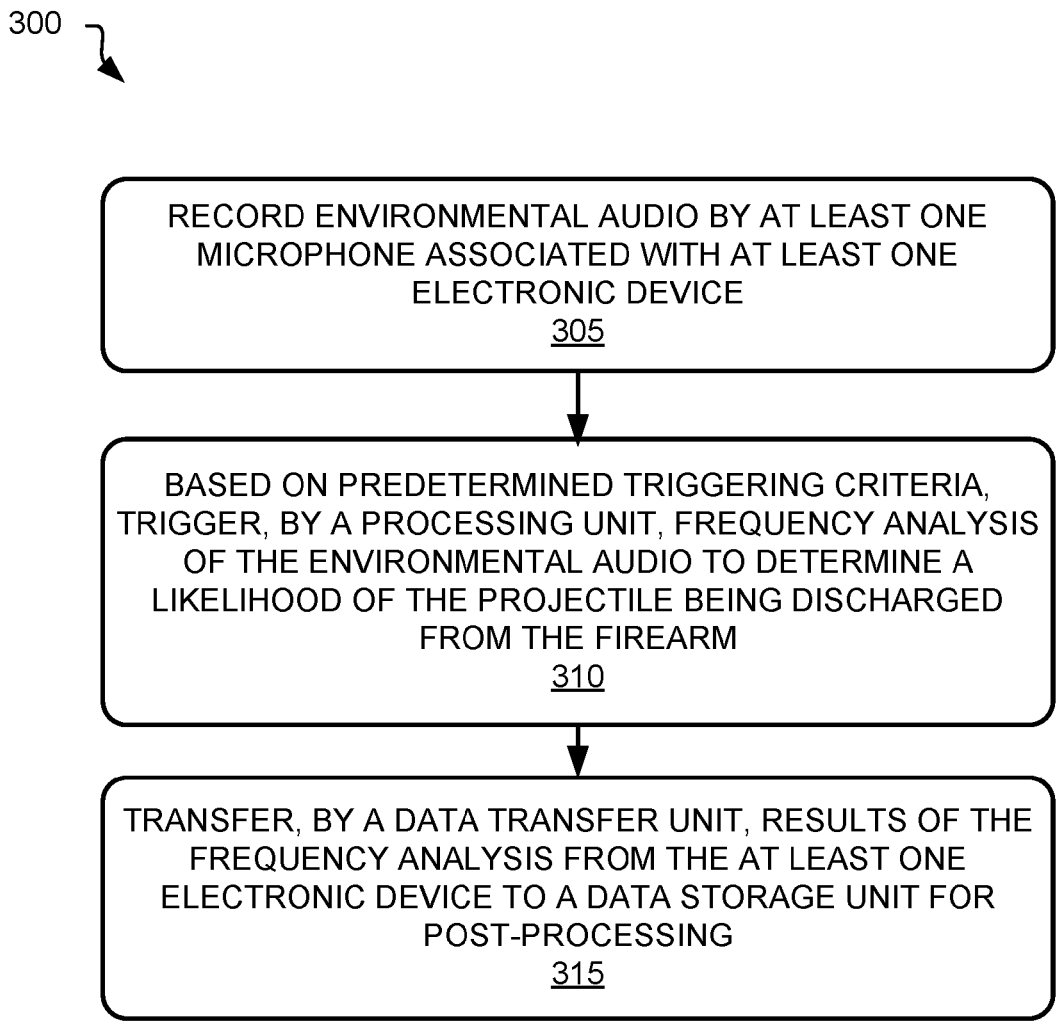
FIG. 3 is a flow chart illustrating a method for detection of a discharge of a projectile from a firearm, in accordance with an example embodiment.

FIG. 3 is a flow chart illustrating a method 300 for detection of a discharge of a projectile from a firearm, in accordance with an example embodiment. In some embodiments, the operations may be combined, performed in parallel, or performed in a different order. The method 300 may also include additional or fewer operations than those illustrated. The method 300 may be performed by processing logic that may comprise hardware (e.g., decision making logic, dedicated logic, programmable logic, and microcode), software (such as software run on a general-purpose computer system or a dedicated machine), or a combination of both.

The method 300 may commence with recording environmental audio by at least one microphone associated with at least one electronic device at operation 305. The at least one microphone may provide the recorded environmental audio to a processing unit. Optionally, upon receipt of the environmental audio by the processing unit, the environment audio may be calibrated based on averaging of an ambient sound level.

The method 300 may further include triggering, by the processing unit, performing of frequency analysis of the environmental audio at operation 310. The analysis may be performed to determine a likelihood of the projectile being discharged from the firearm. The triggering may be initiated based on predetermined triggering criteria.

The frequency analysis may include passing the environmental audio through a FFT. The FFT may provide a full spectrum of a frequency and an amplitude of an audio wave of the environmental audio over time. The frequency analysis may further include detecting a first peak in an amplitude of a sound wave generated by the environmental audio. The first peak may be indicative of the projectile breaking a sound barrier. The frequency analysis may continue with detecting a second peak in the amplitude of the sound wave. The second peak may be indicative of an explosion expelling the projectile from the firearm (i.e., a muzzle blast). Then, a proximity between the first peak and the second peak is determined. The proximity between the peak and the second peak is a time difference between the projectile breaking a sound barrier and the explosion expelling the projectile from the firearm. Upon determining two peaks, the first peak and the second peak may be correlated based on a predetermined correlation to determine the likelihood of the projectile being discharged from the firearm. The correlation may be based on at least one of the following: the proximity between the first peak and the second peak and a relationship between frequencies of the first peak and the second peak and predetermined frequencies ranges of a sound indicative of breaking a sound barrier and a sound of explosion expelling the projectile. Optionally, the method 300 may further include adjusting the correlation using artificial intelligence model generation.

The method 300 may continue with operation 315, at which results of the frequency analysis may be transferred, by a data transfer unit, from the at least one electronic device to a remote data storage unit for a post-processing. The post-processing may include one or more of the following: formatting data for visualization on a user interface, a triangulation of an origin of the projectile, an improvement of the correlation, and so forth.

The method 300 may optionally continue with recording detection times of the first peak and the second peak. The detection times may be synchronized using a geosynchronous satellite source. The method 300 may further include recording locations of the at least one electronic device during the detection of the first peak and the detection of the second peak using location services associated with the at least one electronic device. The method 300 may continue with determining an origin and discharge time of the projectile based on a triangulation of the locations of the at least one electronic device for corresponding detection times.

Additionally, the method 300 may include issuing an alert based on the likelihood of the projectile being discharged from the firearm exceeding a predetermined threshold. The alert may include one or more of the following: an email, a Short Message Service (SMS) text, an audible signal, a visual signal, and so forth. The alert can be sent, e.g., in a form of the audible signal or visual signal, to an administrator of the data viewing portal, an emergency operator, a third party, and the like. In some example embodiments, upon determination of the likelihood of the projectile being discharged from the firearm, a command to record live-stream video/and or audio may be sent to the electronic device. Upon receipt of the command, the electronic device may start recording live-stream video/and or audio of the environment surrounding the electronic device.

Figure 4:
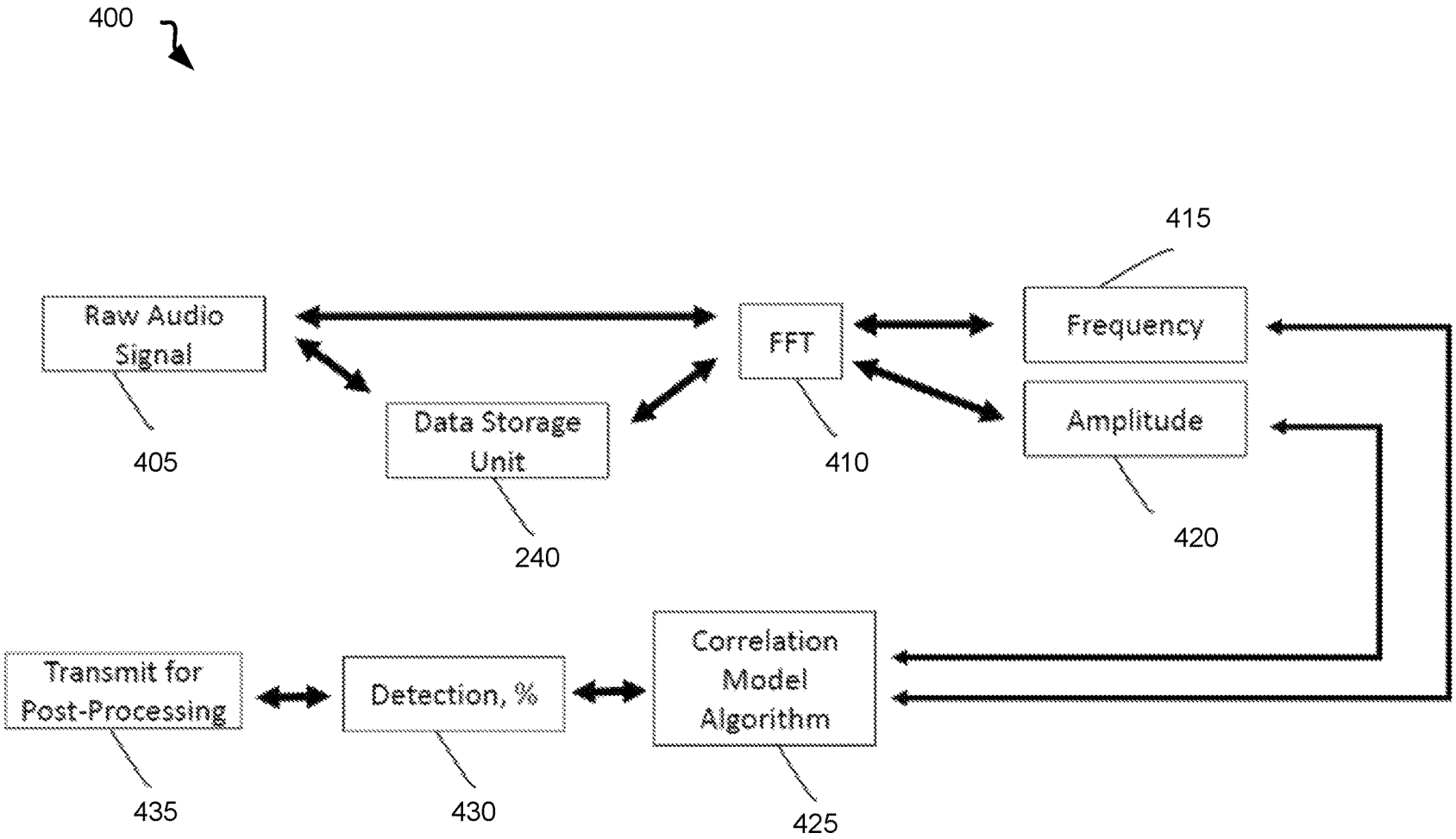
FIG. 4 is a flow chart showing signal processing using a method for detection of a discharge of a projectile from a firearm, in accordance with an example embodiment.

FIG. 4 is a flow chart showing details of signal processing 400 using the method for detection of a discharge of a projectile from a firearm. FIG. 4 describes the data flow and logic that the system 200 shown on FIG. 2 executes for determining the likelihood that a projectile was discharged. Raw audio signal 405 is received, stored, and/or buffered by a processing unit using the data storage unit 240, and passed through a FFT algorithm 410 in real-time. The output of the FFT algorithm 410 is a full spectrum of frequency 415 and amplitude 420 over time. The spectrum of frequency 415 and the spectrum of amplitude 420 over time are analyzed by a correlation model algorithm 425. The correlation model algorithm 425 is used to perform a correlation analysis of the spectrum of frequency 415 and the spectrum of amplitude 420 and calibrated models of projectile audio signals. The calibrated models of projectile audio signals may be predetermined signals stored in the correlation model algorithm. The output from the correlation model algorithm 425 is a result showing the likelihood of detection 430 (in percent) that a projectile was discharged. The result showing the likelihood of detection 430 is stored by the processing unit in the data storage unit and transmitted to one or more remote data processing and storage servers for further storage and post processing 435. Additionally, upon determining the likelihood of detection 430, one or more predetermined actions can be initiated by the processing unit.

Figure 5:
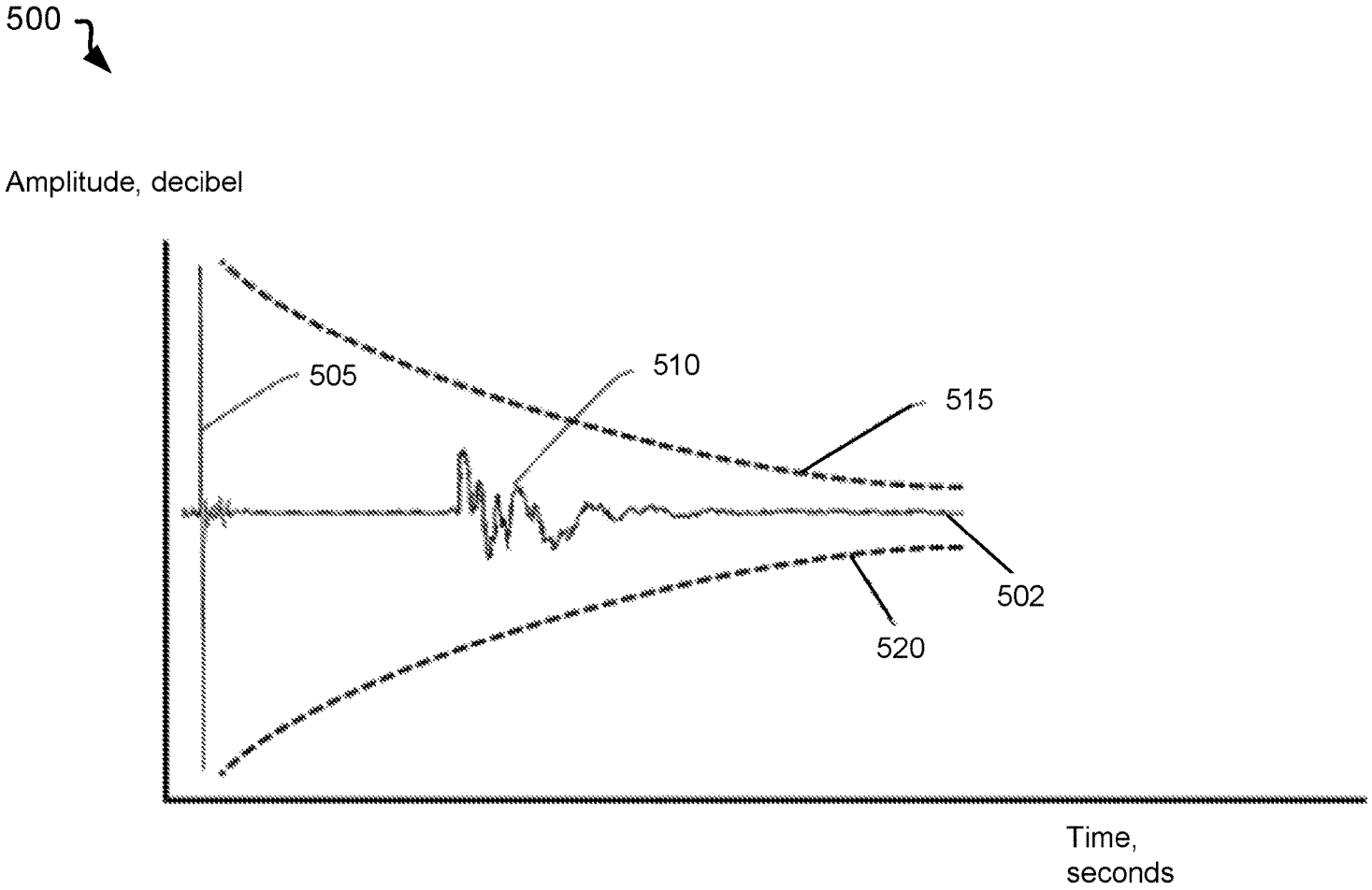
FIG. 5 is a schematic diagram illustrating a correlation model algorithm, in accordance with an example embodiment.

FIG. 5 is a schematic diagram 500 illustrating a correlation model algorithm. Diagram 500 shows unique audio signal elements of an audio signal 502 generated by a supersonic lethal projectile. A first peak 505 represents the amplitude of the wave propagation that is generated by a projectile traveling with the speed greater than the speed of sound. A series of peaks 510 represents the sound generated and received when the projectile is expelled from a confined chamber of a firearm. The bounds above 515 and below 520 the audio signal 502 represent the model that is used in the comparison of the audio signal 502 to the correlation model. The correlation model can be applied for both supersonic and subsonic projectiles.

Figure 6:
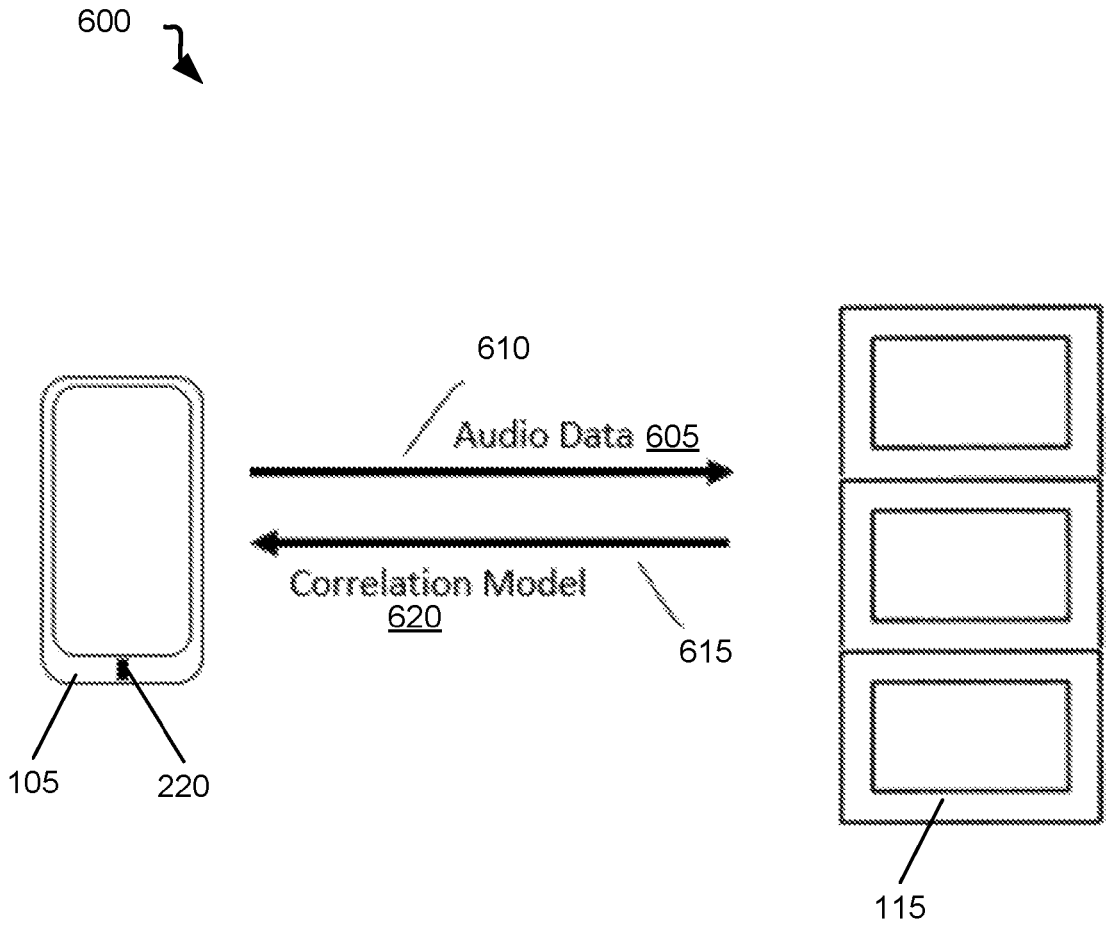
FIG. 6 is a schematic diagram illustrating handling of data for detection of a discharge of a projectile from a firearm, in accordance with an example embodiment.

FIG. 6 is a schematic diagram 600 illustrating handling of data for detection of a discharge of a projectile from a firearm. Audio data 605 received by a microphone 220 of an electronic device 105 can be recorded and then transmitted at step 610 to a data processing and storage server 115 for post-processing. The post-processing can include audio storage, projectile origin triangulation, model correlation evaluation, model correlation improvement, and so forth. The improved correlation model 620 can then be transferred back at step 615 to the electronic device 105 to be applied in further detection of the projectile discharge.

Figure 7:
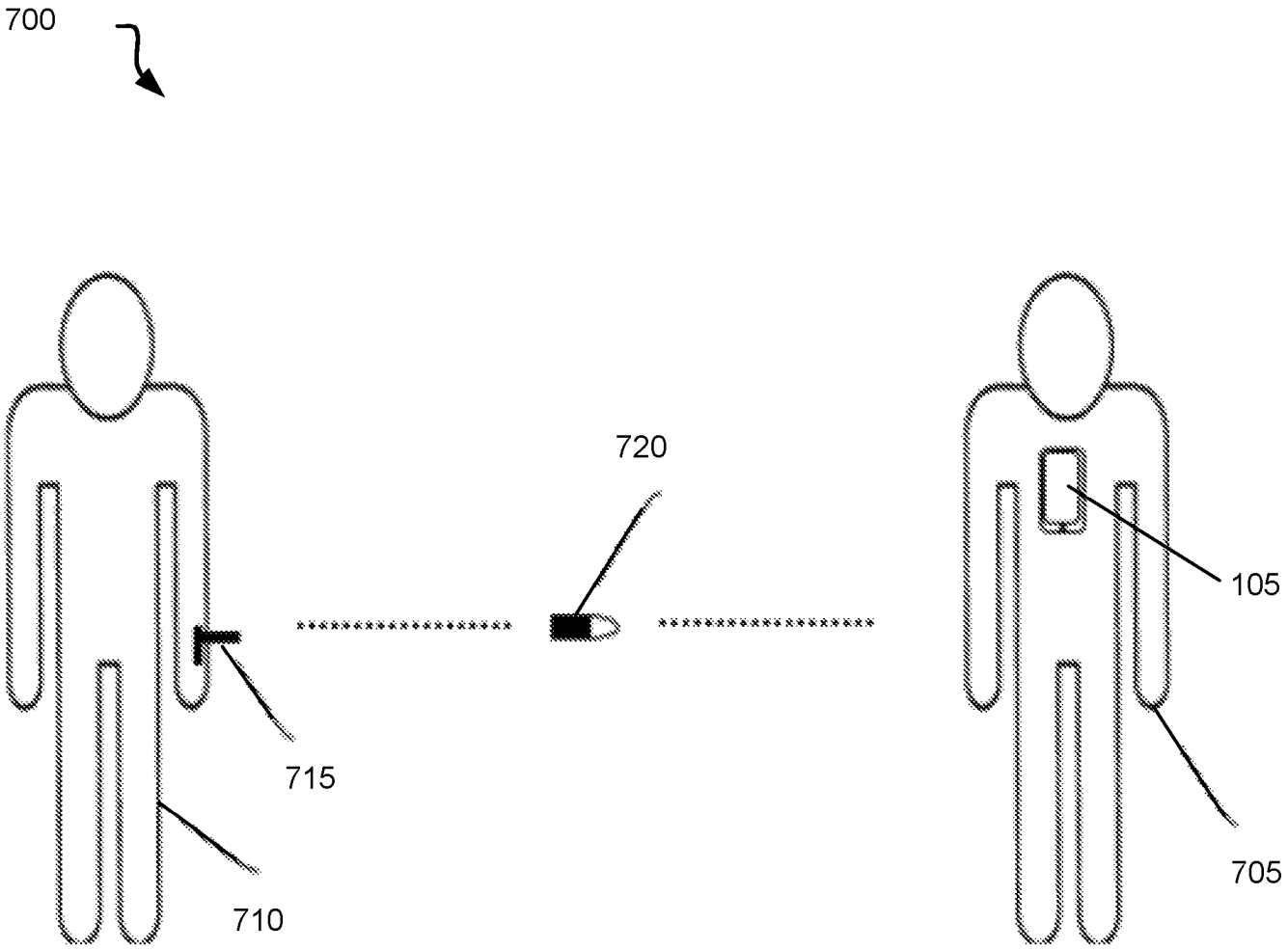
FIG. 7 is a schematic diagram illustrating detection of a discharge of a projectile from a firearm, in accordance with an example embodiment.

FIG. 7 is a schematic diagram 700 illustrating an example embodiment of detection of a discharge of a projectile from a firearm. A first individual 705 may wear an electronic device 105 on a body of the first individual 705. A software application associated with a system for detection of a discharge of a projectile from a firearm may be running on the electronic device 105. A second individual 710 may discharge a weapon 715 with a projectile 720 traveling in the direction of the first individual 705. The electronic device 105 may perform the detection of the discharge of the projectile 720 as described above with reference to FIGS. 1-6.

Figure 8:
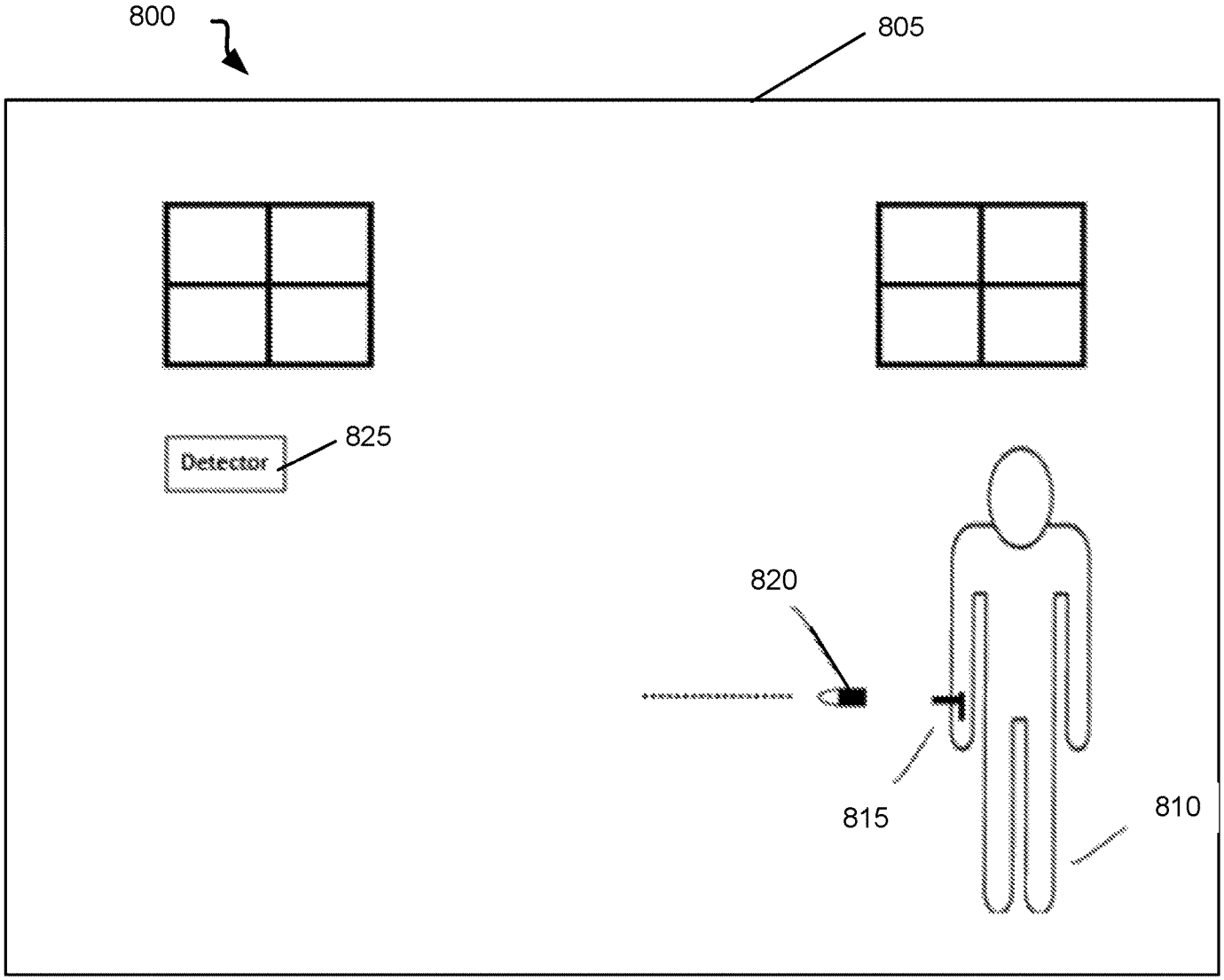
FIG. 8 is a schematic diagram illustrating detection of a discharge of a projectile from a firearm indoors, in accordance with an example embodiment.

FIG. 8 is a schematic diagram 800 illustrating an example embodiment of detection of a discharge of a projectile from a firearm indoors 805. An individual 810 may discharge a weapon 815 and a projectile 820 may be expelled indoors 805. A discharge detection hardware device shown as a detector 825 may be affixed to a wall indoors 805. The detector 825 may receive the audio signal of the discharge of the projectile 820 from the weapon 815. The detector 825 may process the audio signal and send the results of the processing, i.e., a report whether the discharge of the projectile 820 is detected, to a remote device, such as a data processing and storage server.

Figure 9:
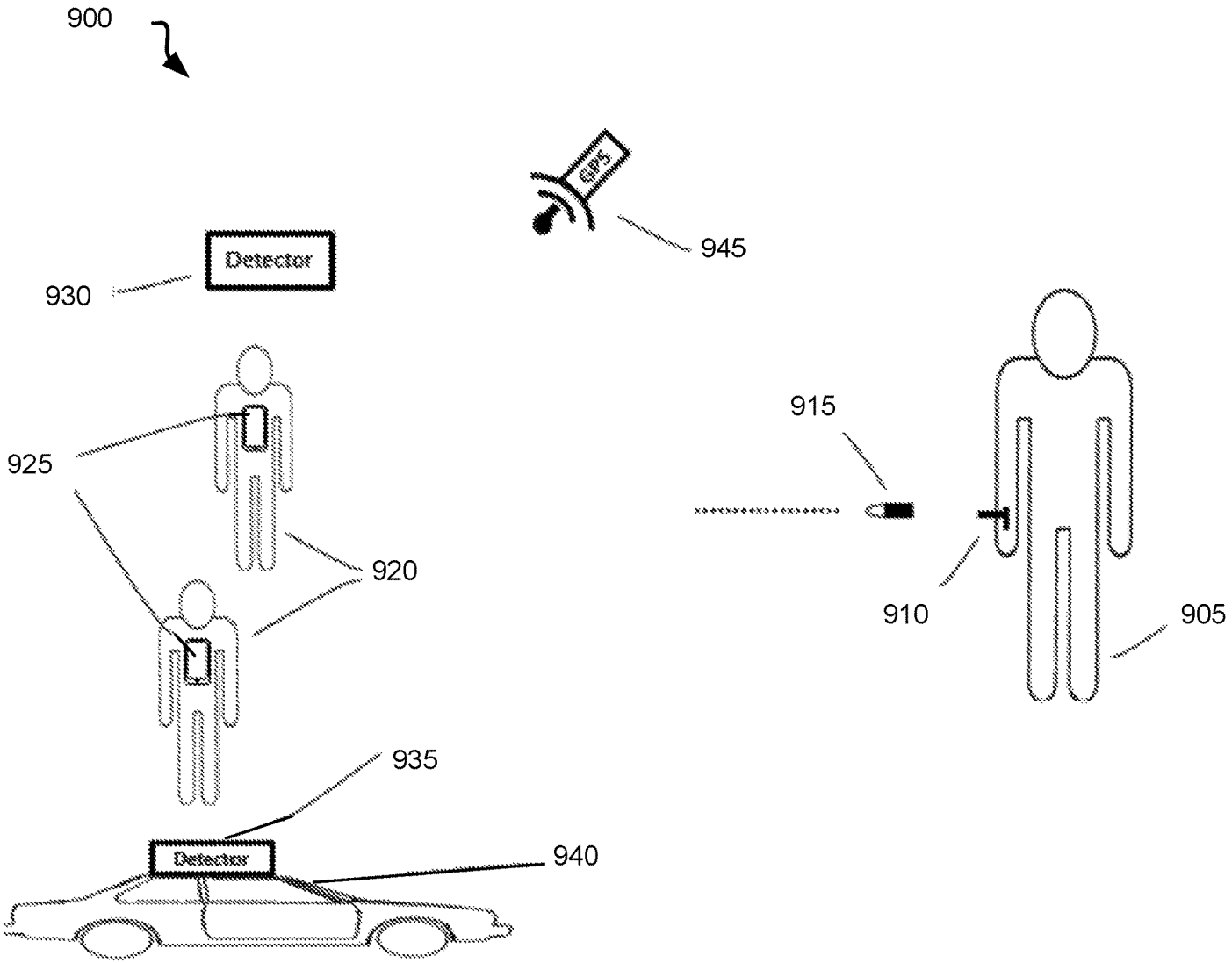
FIG. 9 is a schematic diagram illustrating detection of a discharge of a projectile from a firearm and triangulation of a projectile origin location, in accordance with an example embodiment.

FIG. 9 is a schematic diagram 900 illustrating an example embodiment of detection of a discharge of a projectile from a firearm and triangulation of the projectile origin location. A first individual 905 discharges a weapon 910 and expels a projectile 915 in an area. Further individuals 920 may have electronic devices 925 with a system for detection of a discharge of a projectile from a firearm running on the electronic devices 925. Additionally, electronic devices acting as detectors of a discharge of a projectile may be installed outdoors as stationary detection devices 930 and mobile detection devices 935 on vehicles 940.

Upon discharge of the projectile 915, all detection devices, namely the electronic devices 925, the stationary detection devices 930, and the mobile detection devices 935, may receive the audio signal for processing. Some or all the detectors in that area may be configured to determine the likelihood of the discharge of the projectile. The detection devices may further transmit data related to the results of the likelihood of the discharge of the projectile (e.g., data in form of "1" if the projectile discharge was detected and data in form of "0" if no projectile discharge was detected) to a data processing and storage server for further analysis. The transmitted data may further include information on the location of each of the detection devices, speed of the electronic device, acceleration of the electronic device, and time on the electronic device when the projectile was detected. The location, speed, acceleration, and time may be received by means of satellite positioning signals 945. The location can also be pre-configured for stationary detection devices 930 to be used for a triangulation algorithm. The triangulation algorithm utilizes the determined locations, speed, and accelerations of the detection devices to calculate the probable origin of the projectile. All real-time clock data of the detection devices in a given triangulation network may be synced using a geosynchronous satellite source. The timestamp recorded when the detection device triggers the detection event may be used to determine the delta time between the time when another detection device triggered the detection event. A correlation model is used to analyze the audio signal recorded by each detection device to ensure the triggering event for all detection devices originated from the same source. The delta time and the recorded positioning information may be used to calculate the origin location of the projectile.

Figure 10:
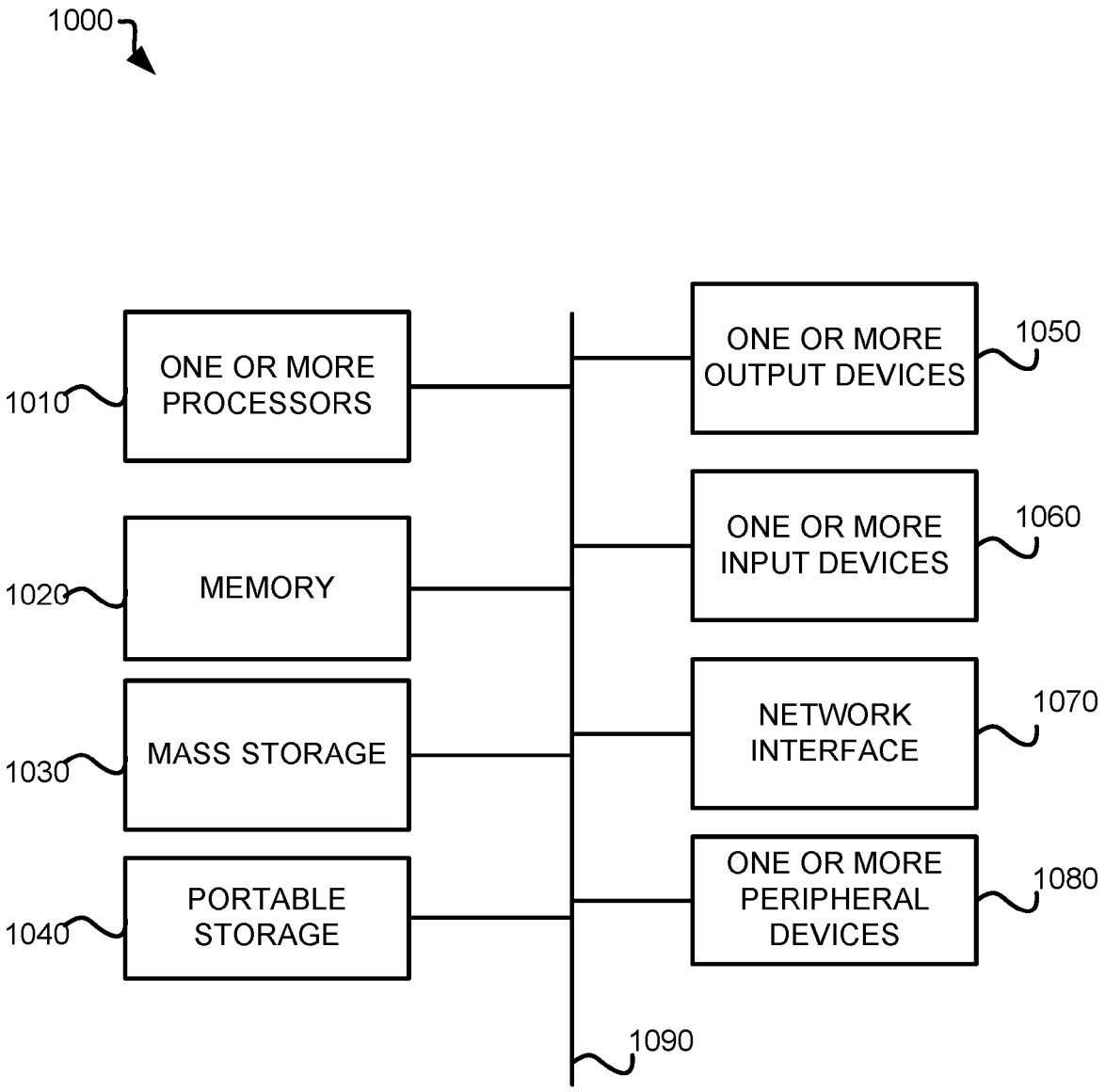
FIG. 10 is a computer system that may be used to implement the method for detection of a discharge of a projectile from a firearm according to an example embodiment.

FIG. 10 illustrates an exemplary computing system 1000 that may be used to implement embodiments described herein. The exemplary computing system 1000 of FIG. 10 may include one or more processors 1010 and memory 1020. Memory 1020 may store, in part, instructions and data for execution by the one or more processors 1010. Memory 1020 can store the executable code when the exemplary computing system 1000 is in operation. The exemplary computing system 1000 of FIG. 10 may further include a mass storage 1030, portable storage 1040, one or more output devices 1050, one or more input devices 1060, a network interface 1070, and one or more peripheral devices 1080.

The components shown in FIG. 10 are depicted as being connected via a single bus 1090. The components may be connected through one or more data transport means. The one or more processors 1010 and memory 1020 may be connected via a local microprocessor bus, and the mass storage 1030, one or more peripheral devices 1080, portable storage 1040, and network interface 1070 may be connected via one or more input/output buses.

Mass storage 1030, which may be implemented with a magnetic disk drive or an optical disk drive, is a non-volatile storage device for storing data and instructions for use by a magnetic disk or an optical disk drive, which in turn may be used by one or more processors 1010. Mass storage 1030 can store the system software for implementing embodiments described herein for purposes of loading that software into memory 1020.

Portable storage 1040 may operate in conjunction with a portable non-volatile storage medium, such as a compact disk (CD) or digital video disc (DVD), to input and output data and code to and from the computing system 1000 of FIG. 10. The system software for implementing embodiments described herein may be stored on such a portable medium and input to the computing system 1000 via the portable storage 1040.

One or more input devices 1060 provide a portion of a user interface. The one or more input devices 1060 may include an alphanumeric keypad, such as a keyboard, for inputting alphanumeric and other information, or a pointing device, such as a mouse, a trackball, a stylus, or cursor direction keys. Additionally, the computing system 1000 as shown in FIG. 10 includes one or more output devices 1050. Suitable one or more output devices 1050 include speakers, printers, network interfaces, and monitors.

Network interface 1070 can be utilized to communicate with external devices, external computing devices, servers, and networked systems via one or more communications networks such as one or more wired, wireless, or optical networks including, for example, the Internet, intranet, LAN, WAN, cellular phone networks (e.g., GSM network, packet switching communications network, circuit switching communications network), Bluetooth radio, and an IEEE 802.11-based radio frequency network, among others. Network interface 1070 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 1080 may include any type of computer support device to add additional functionality to the computing system. The one or more peripheral devices 1080 may include a modem or a router.

The components contained in the exemplary computing system 1000 of FIG. 10 are those typically found in computing systems that may be suitable for use with embodiments described herein and are intended to represent a broad category of such computer components that are well known in the art. Thus, the exemplary computing system 1000 of FIG. 10 can be a PC, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, systems and methods for detection of a discharge of a projectile from a firearm are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for detection of a discharge of a projectile from a firearm, the system comprising:

a microphone associated with at least one electronic device, the microphone being configured to record environmental audio;

a processing unit associated with the at least one electronic device configured to:

trigger, based on predetermined triggering criteria, a frequency analysis of the environmental audio to determine:

a first peak in an amplitude of a sound wave generated by the environmental audio, the first peak being indicative of the projectile breaking a sound barrier or an explosion expelling the projectile from the firearm;

a second peak in the amplitude of the sound wave, the second peak being indicative of the projectile breaking the sound barrier or the explosion expelling the projectile from the firearm; and a time difference between the first peak and the second peak; and correlate the time difference and a relationship between a frequency of the first peak and a frequency of the second peak with a model to determine a likelihood of the projectile being discharged from the firearm;

a data transfer unit configured to transfer a value of the likelihood and results of the frequency analysis from the at least one electronic device to a data storage unit for a post-processing; and the data storage unit in communication with the processing unit, the data storage unit being configured to store at least the results of the frequency analysis.

2. The system of claim 1, wherein the predetermined triggering criteria include the environmental audio exceeding a predetermined decibel level.

3. The system of claim 1, wherein the model includes a first boundary curve and a second boundary curve to be compared to an amplitude of the first peak and an amplitude of the second peak, the second peak being distanced from the first peak by the time difference.

4. The system of claim 3, wherein the post-processing includes one or more of the following: formatting data for visualization on a user interface, a triangulation of an origin of the projectile, and an improvement of the model.

5. The system of claim 1, wherein the correlation is based on a proximity between the first peak and the second peak.

6. The system of claim 1, wherein the processing unit is further configured to:

record detection times of the first peak and the second peak;

synchronize the detection times using a geosynchronous satellite source;

record locations of the at least one electronic device during the detection of the first peak and the second peak using location services associated with the at least one electronic device; and determine an origin and discharge time of the projectile based on a triangulation of the locations of the at least electronic device for corresponding detection times.

7. The system of claim 1, wherein the frequency analysis includes:

passing the environmental audio through a Fast Fourier Transform (FFT); and receiving, from the FFT, a full spectrum of a frequency and an amplitude of an audio wave of the environmental audio over time.

8. The system of claim 1, wherein the transferring the results of the frequency analysis from the at least one electronic device to the data storage unit for post-processing is performed using one or more of the following protocols: Ethernet, Fiber optics, a mobile data protocol, cellular network, WiFi, Bluetooth, Bluetooth low energy, ultra-high frequency 2-way radio, very high frequency 2-way radio, Near Field Communication, Satellite, ZigBee, Microwave, and an Infrared radiation protocol.

9. The system of claim 1, wherein the at least one electronic device is a smart phone, a stationary device, or a device installed on a vehicle.

10. The system of claim 1, wherein the projectile is a bullet.

11. A method for detection of a discharge of a projectile from a firearm, the method comprising:

recording environmental audio by at least one microphone associated with at least one electronic device;

based on predetermined triggering criteria, triggering, by a processing unit, a frequency analysis of the environmental audio to determine:

a first peak in an amplitude of a sound wave generated by the environmental audio, the first peak being indicative of the projectile breaking a sound barrier or an explosion expelling the projectile from the firearm;

a second peak in the amplitude of the sound wave, the second peak being indicative of the projectile breaking the sound barrier or the explosion expelling the projectile from the firearm; and a time difference between the first peak and the second peak; and correlating, by the processing unit, the time difference and a relationship between a frequency of the first peak and a frequency of the second peak with a model to determine a likelihood of the projectile being discharged from the firearm; and transferring, by a data transfer unit, a value of the likelihood and results of the frequency analysis from the at least one electronic device to a data storage unit for a post-processing.

12. The method of claim 11, wherein the model includes a first boundary curve and a second boundary curve to be compared to an amplitude of the first peak and an amplitude of the second peak, the second peak being distanced from the first peak by the time difference.

13. The method of claim 12, wherein the post-processing includes one or more of the following: formatting data for visualization on a user interface, a triangulation of an origin of the projectile, and an improvement of the model.

14. The method of claim 11, wherein the correlation is based on a proximity between the first peak and the second peak.

15. The method of claim 11, further comprising adjusting the correlation using artificial intelligence model generation.

16. The method of claim 11, further comprising:

recording detection times of the first peak and the second peak;

synchronizing the detection times using a geosynchronous satellite source;

recording locations of the at least one electronic device during the detection of the first peak and the second peak using location services associated with the at least one electronic device; and determining an origin and discharge time of the projectile based on a triangulation of the locations of the at least electronic device for corresponding detection times.

17. The method of claim 11, wherein the frequency analysis includes:

passing the environmental audio through a Fast Fourier Transform (FFT); and receiving, from the FFT, a full spectrum of a frequency and an amplitude of an audio wave of the environmental audio over time.

18. The method of claim 11, further comprising issuing an alert based on the likelihood of the projectile being discharged from the firearm exceeding a predetermined threshold, the alert including one or more of the following: an email, a text message, and an audible signal.

19. The method of claim 11, further comprising calibrating the environment audio based on averaging of an ambient sound level.

20. A system for detection of a discharge of a projectile from a firearm, the system comprising:

a microphone associated with at least one electronic device, the microphone being configured to record environmental audio;

a processing unit associated with the at least one electronic device configured to:

trigger, based on predetermined triggering criteria, a frequency analysis of the environmental audio to determine:

a first peak in an amplitude of a sound wave generated by the environmental audio, the first peak being indicative of the projectile breaking a sound barrier or an explosion expelling the projectile from the firearm;

a second peak in the amplitude of the sound wave, the second peak being indicative of the projectile breaking the sound barrier or the explosion expelling the projectile from the firearm; and a time difference between the first peak and the second peak; and correlate the time difference and a relationship between a frequency of the first peak and a frequency of the second peak with a model to determine a likelihood of the projectile being discharged from the firearm, wherein the frequency analysis includes issuing an alert based on the likelihood of the projectile being discharged from the firearm exceeding a predetermined threshold, the alert including one or more of the following: an email, a text message, and an audible signal; and a data transfer unit configured to transfer a value of the likelihood and results of the frequency analysis from the at least one electronic device to a data storage unit for a post-processing; and the data storage unit in communication with the processing unit, the data storage unit being configured to store at least the results of the frequency analysis.

*21. A system for detection of a discharge of a projectile from a firearm, the system comprising:*

*a microphone associated with at least one electronic device, the microphone being configured to record environmental audio;*

*a processing unit associated with the at least one electronic device configured to:*

*perform a frequency analysis of the environmental audio to determine:*

*a first peak in an amplitude of a sound wave generated by the environmental audio, the first peak being indicative of the projectile breaking a sound barrier or an explosion expelling the projectile from the firearm;*

*a second peak in the amplitude of the sound wave, the second peak being indicative of the projectile breaking the sound barrier or the explosion expelling the projectile from the firearm; and*

*a time difference between the first peak and the second peak; and*

*correlate the time difference and a relationship between a frequency of the first peak and a frequency of the second peak with a model to determine a likelihood of the projectile being discharged from the firearm;*

*a data transfer unit configured to transfer a value of the likelihood and results of the frequency analysis from the at least one electronic device to a data storage unit for a post-processing; and*

*the data storage unit in communication with the processing unit, the data storage unit being configured to store at least the results of the frequency analysis.*

*22. A method for detection of a discharge of a projectile from a firearm, the method comprising:*

*recording environmental audio by at least one microphone associated with at least one electronic device;*

*performing, by a processing unit, a frequency analysis of the environmental audio to determine:*

*a first peak in an amplitude of a sound wave generated by the environmental audio, the first peak being indicative of the projectile breaking a sound barrier or an explosion expelling the projectile from the firearm;*

*a second peak in the amplitude of the sound wave, the second peak being indicative of the projectile breaking the sound barrier or the explosion expelling the projectile from the firearm; and*

*a time difference between the first peak and the second peak; and*

*correlating, by the processing unit, the time difference and a relationship between a frequency of the first peak and a frequency of the second peak with a model to determine a likelihood of the projectile being discharged from the firearm; and*

*transferring, by a data transfer unit, a value of the likelihood and results of the frequency analysis from the at least one electronic device to a data storage unit for a post-processing.*

* * * * *